Dec. 20, 1966          W. C. TUCKER, SR          3,292,520
                    PHOTOGRAPHIC FILM HANGER
Filed June 10, 1964                           2 Sheets-Sheet 1
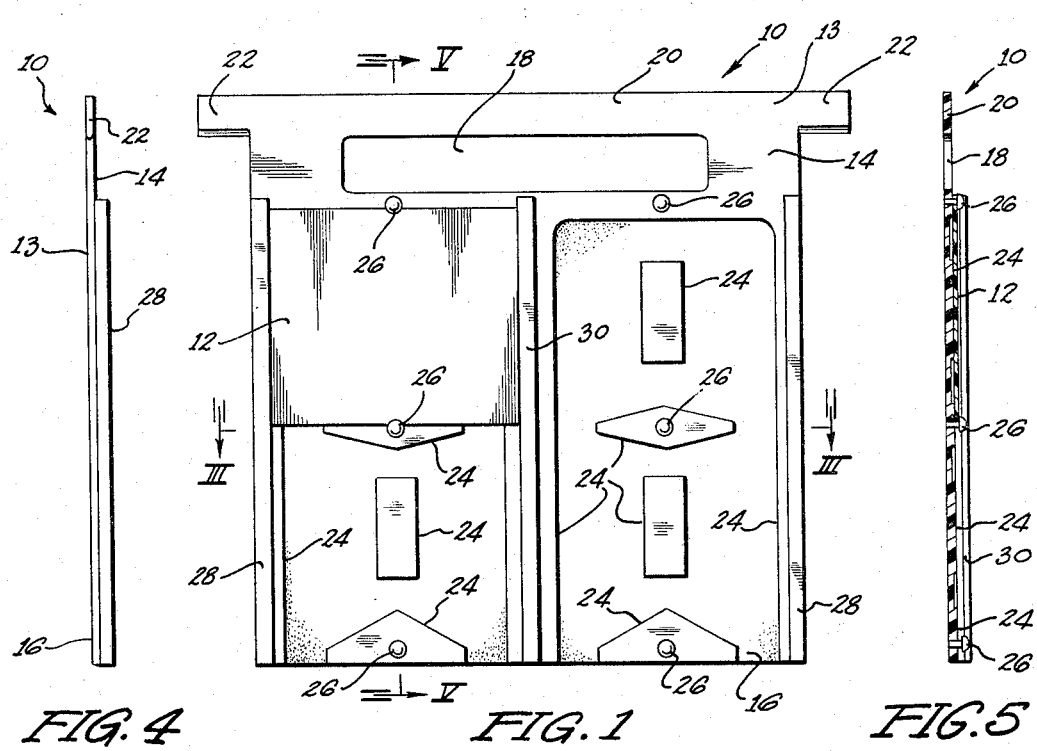
FIG. 4          FIG. 1          FIG. 5
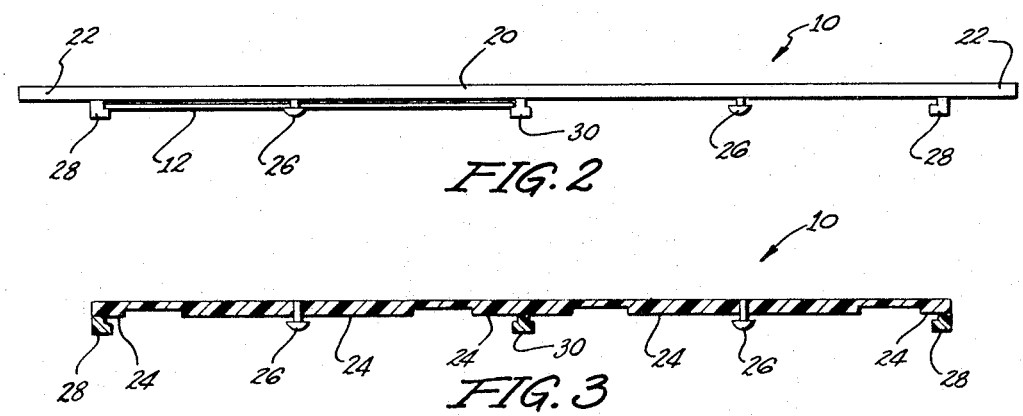
FIG. 2
FIG. 3
INVENTOR.
WILLIAM C. TUCKER, SR.
BY
Olsen and Stephenson
ATTORNEYS Dec. 20, 1966      W. C. TUCKER, SR      3,292,520

PHOTOGRAPHIC FILM HANGER

Filed June 10, 1964      2 Sheets-Sheet 2

INVENTOR.
WILLIAM C. TUCKER, SR.
BY
Olsen and Stephenson
ATTORNEYS

United States Patent Office 3,292,520
Patented Dec. 20, 1966

3,292,520
PHOTOGRAPHIC FILM HANGER
William C. Tucker, Sr., Lathrup Village, Mich., assignor to Photo Plastics Inc., Detroit, Mich., a corporation of Michigan
Filed June 10, 1964, Ser. No. 374,095
6 Claims. (Cl. 95—100)

The present invention relates to photographic film processing equipment, and in particular to a film hanger for holding the film negative during the development process.

During the development of films and particularly of color film, it is the conventional practice to support the film on a film hanger and a plurality of such hangers are then placed in a film rack which is suspended in a tank containing the developing solution. These hangers and racks have an open frame structure, and the conventional hangers have grooves or slots on four sides into which the edges of the negatives are inserted.

During this operation, it is important that processing chemicals reach all portions of the film surface, and that adjacent films do not touch each other while they are still wet. Furthermore, in the development of color pictures, one part of the development process requires that the negative be exposed to light, and it is important to the successful development of the film that this light uniformly reach all portions of the film surface.

In order to assure that processing chemicals reach all portions of the film surface, it is common practice to use either hand or gas agitation of the solution. One of the problems encountered in the processing of the film, either color or black and white, is the interference caused by the conventional hangers to the proper flow of the liquids, and this is true whether using hand or gas agitation. When using gas agitation, it is the common practice to introduce or inject streams of gas for short time durations at prescribed time intervals into the solution, at a level below that of the hangers so that the gas which is introduced will bubble upwardly between the hangers so as to agitate the solution in an effort to obtain proper flow of the solution across the surfaces of the film.

However, it is found that the hangers, which are presently in use, create obstructions adjacent to the edges of the films, and particularly along the bottom and top of the films so that the desired flow of the solution is not obtained uniformly across the entire surface of each film. As can be readily understood, when the top and bottom edges of the film are seated in channel members, the liquid adjacent to the film of such channel members is protected from movement resulting from the gas agitation, and therefore, the desired flow of the solution is not realized at these edges of the films, and thus, uniform developing of the film is not realized.

Another problem encountered with the prior art devices is that the hangers employed have conventionally been made of metals which make it necessary that the hangers used in conjunction with a particular rack must all be of the same specific size, otherwise, one hanger will interfere with the film in another hanger when the film is being exposed to light. Thus, it has been found necessary that all negatives of the same size must be developed at the same time, otherwise, hangers which are being used in connection with the development of a small negative will interfere with the proper development of a larger negative which is supported on a second hanger of different construction.

Still another problem of the prior art hanger structures has been the need to space them sufficiently far apart so that the film in one hanger will not inadvertently come into contact with the film in an adjacent hanger. As indicated above, the conventional hangers heretofore used have been open inside the frame portion, and therefore considerable care has been required so that when inserting the hangers into a rack, that the film from the one hanger does not contact the film from the adjacent hanger. These conventional hangers have also required particular care to be used so that when the rack is inserted into a container with the solution that the solution does not wash the film from their loosely held positions within the hangers.

With the above problems in mind, it is an object of the present invention to provide a film hanger which is constructed and arranged to assure that the processing chemicals reach all portions of the film surface so that uniform developing of the film occurs.

It is another object of the present invention to provide a film hanger of the foregoing character which is constructed and arranged to increase the film handling capacity of a given developing tank.

It is still another object of the present invention to provide a film hanger which is constructed and arranged in such a manner as to assure that the film or films supported in one hanger cannot inadvertently come into contact with the film or films supported on the next adjacent film hanger, when such hangers are placed in the normal positions in a film rack.

It is still another object of the present invention to provide a film hanger which is constructed and arranged to assure that the film will not be inadvertently dislodged from the hanger once the film has been mounted thereon.

It is still another object of the present invention to provide a film hanger of the foregoing character wherein the light necessary to be used during the development of color film can be provided to the negative by shining light directly upon the film through the hanger or rack while it is held therein.

Other objects of this invention will appear in the following description and appended claims, reference being had to the accompanying drawings forming a part of this specification wherein like reference characters designate corresponding parts in the several views.

In the drawings:

FIGURE 1 is a front elevational view of a film hanger embodying the present invention, and showing one film mounted thereon;

FIGURE 2 is a top plan view of the illustrated embodiment of FIGURE 1;

FIGURE 3 is a sectional view taken on the line 3—3 of FIGURE 1;

FIGURE 4 is an end elevation of the embodiment shown in FIGURE 1;

FIGURE 5 is a vertical sectional view taken on the line 5—5 of FIGURE 1;

Figure 6:
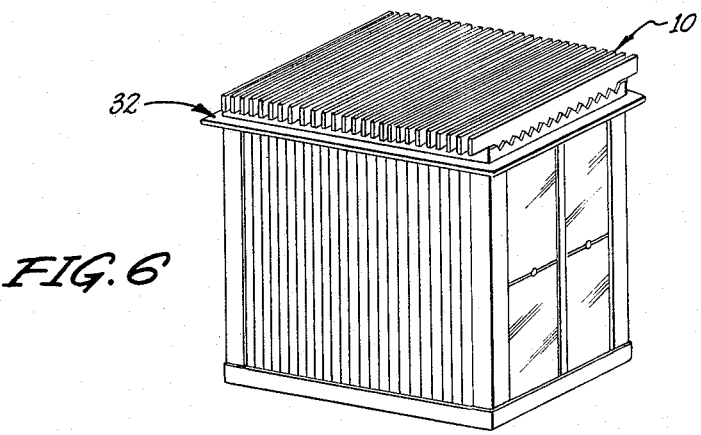
FIGURE 6 is a perspective view of a rack supporting a plurality of film hangers embodying the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. In FIGURES 1 to 5, inclusive, is shown the film hanger 10, by which four film negatives to be developed can be suspended in a tank. Only one such negative 12 is shown mounted on the hanger 10, but it will be readily understood that four such negatives can be supported in the four corners or quadrants of the hanger. The hanger 10 includes the panel 13 which has an upper portion 14 and a lower portion 16. The upper portion 14 includes the elongated opening or transverse slot 18 which provides the handle 20, thereabove. Extending laterally from the upper portion 14 are the supporting arms 22 which are used to support the hanger 10 in a manner subsequently to be described. The lower portion 16 is an unapertured or closed panel portion which has the surface recessed so as to provide a plurality of lands 24. Projecting outwardly from certain of the lands 24 are the pins 26 which have enlarged heads, and extending in a vertical direction along the opposite edges are the channel members 28 with such channel members 28 being open at the top and bottom. Also mounted on the land 24 which extends vertically in the midportion of the lower portion 16 is the channel member 30 which also is open at the top and bottom. It will be observed that the channel members 28 and 30 are adapted to receive the vertical or side edges of film, such as the film negative 12, and the pins 26 are adapted to support the horizontal or upper and lower edges of such film negative 12. It is also to be observed that when a film negative 12 is supported by the hanger 10, there is substantially no obstruction at the top or bottom of the hanger which will interfere with the upward bubbling action of gases during the gas agitation process, and therefore, the solution of processing chemicals will be caused to flow uniformly over all surfaces of the negative 12 during this agitation process.

One of the features of the present invention is that it also permits the chemicals to act on both surfaces of the photographic film. As pointed out above, in the conventional hangers heretofore used, a cutout opening is provided in the hanger to permit chemicals to act on both surfaces of the film. In the use of the present invention, advantage is taken of the normal expansion of the film during the processing to bulge the film outward and to permit the chemicals to flow over the back of the film. The recessed areas of the pan 13 which provide the lands 24 further cooperate in assuring the free flow of the solution to both the back and front side of the film. In this respect it will be noted that there is one such land 24 centrally located in each of the four quadrants of the panel 13.

The use of the channel members 28 and 30 on the sides of the film negative 12, permits the film to be held in place when first placed in a photographic solution. As the film expands, it bulges outwardly and the retaining pins prevent the film from leaving the support plate. Thus, when the gas agitation takes place, it is found that the solution is caused to flow between the film and the recessed surface of the panel 13 to produce the desired even development of the film.

Also, by virtue of the fact that the panel 13 can be formed of a solid piece of translucent or transparent plastic material, the desired exposure of light can take place during the processing of color film.

Figure 7:
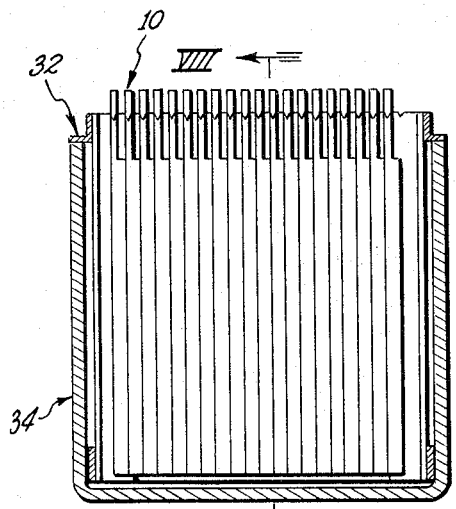
FIGURE 7 is an end elevation of the rack and hangers of FIGURE 6, showing the same inserted into a tank, shown in section.
Figure 8:
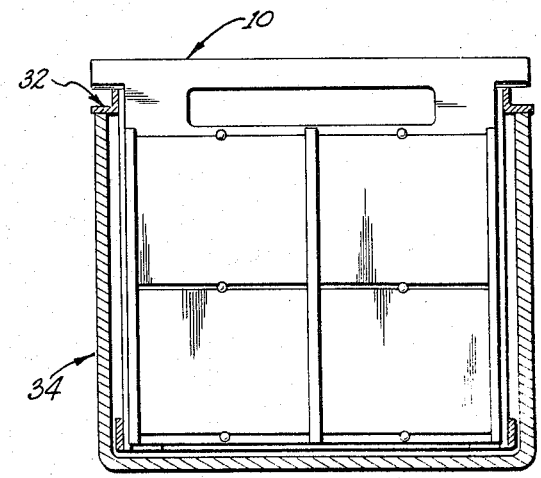
FIGURE 8 is a vertical sectional view taken on the line 8—8 of FIGURE 7.

Referring to FIGURE 6, it can be seen that a plurality of hangers 10 can be supported in a conventional hanger rack 32, and as shown in FIGURES 7 and 8, the hanger rack 32 with the hangers 10 can then be inserted into any conventional tank 34 containing the necessary chemical developing solutions. Any form of conventional gas agitation means (not shown) may be used in conjunction with the tank 34 for carrying on the developing processes which have been described above.

Figure 9:
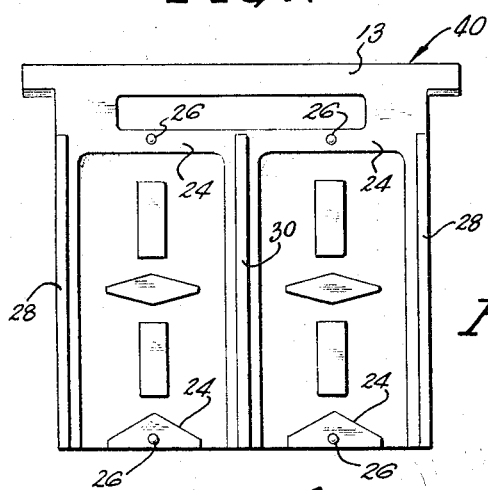
FIGURE 9 is a front elevational view drawn to reduced scale, of a hanger which is constructed to support two negatives of conventional sizes.
Figure 10:
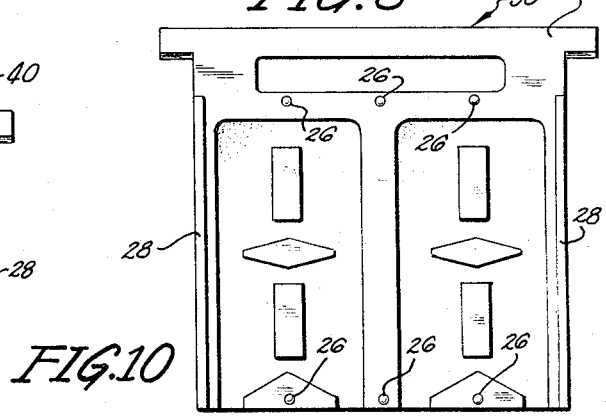
FIGURE 10 is a front elevational view drawn to a reduced scale of another form of a film hanger designed to support a single film.

Another feature of the present invention is the unique design of the panel 13 which enables it to be used as a basic panel in manufacturing hangers for use with 8" x 10", 5" x 7" or 4" x 5" standard size negatives. Thus, the hanger 10 shown in FIGURE 1 is particularly designed for use with conventional 4" x 5" negatives, the hanger 40, FIGURE 9, is designed for use with 5" x 7" negatives, and the hanger 50, shown in FIGURE 10, is designed for use in developing an 8" x 10" negative. The basic panel 13 can similarly be used in making hangers for use with film negatives of still other sizes.

Referring to FIGURE 9, it will be observed that there are only four pins 26 projecting from the lands 24, and thus, the hanger will normally support only two film negatives, one on each of the right and left sides of the hanger. In a similar fashion, the hanger 50, shown in FIGURE 10, has a panel 13 which is identically the same as the panels 13 of FIGURES 9 and 1, but in hanger 50, the channel 30 has been omitted, and three pins 26 project from the panel 13 near the bottom edge thereof and near the top thereof. Thus, the hanger 50 is designed to support only a single film negative having a dimension of 8 x 10 inches.

It will be observed, that, if desired, hangers of the designs of FIGURES 1, 9 and 10 may all be inserted into the rack 32 at the same time, and the one hanger will not interfere with the developing of films in the other hangers. This is equally true even though the negatives may be color film which requires exposure to light during the developing process. By virtue of the fact that the hangers are translucent or transparent, there will be no shadows or interferences from the one hanger which will in any way obstruct light from passing to the negatives in the next adjacent hanger.

From the foregoing, it can readily be understood that one plate 13 can be used to make any number of hangers all of which can be used together in the same film rack 32. Also, there is little likelihood that any of the film negatives 12 will be dislodged from their hanger when being inserted into the tank 34, and there is no danger that one negative will contact the negative that is mounted in the next adjacent hanger, because there are not openings in the plate 13 which will permit this to happen. Also, the maximum number of hangers that the tanks can hold can be inserted into such tanks, irrespective of the sizes of film being developed, and optimum developing results will be realized. Thus, the developing solutions will be used in the most efficient manner.

Having thus described my invention, I claim:

1. A film hanger for holding film during processing operations comprising a translucent panel having a lower unapertured portion on which film is adapted to be supported and an upper portion having a transverse slot providing a handle thereabove and arms extending outwardly beyond the lateral edges of the lower portion for supporting the hanger in a rack, said lower portion having one surface recessed so as to define a plurality of lands thereon, film supporting pins projecting outwardly from certain of said lands, and vertically extending channel members open at their ends mounted on opposite edges of said one surface for receiving lateral edges of film supported on said pins.

2. A film hanger for holding film during processing operations comprising a translucent panel having a lower unapertured portion on one surface of which film is adapted to be supported, and an upper portion having arms extending laterally beyond the lateral edges of the lower portion for supporting the hanger in a rack, said lower portion having one surface on which are a plurality of lands, film supporting pins projecting outwardly from certain of said lands, and vertically extending channel members mounted on said one surface for receiving edges of film supported on said pins.

3. A film hanger for holding film during processing operations comprising a translucent panel having a lower unapertured portion on one surface of which film is adapted to be supported, and an upper portion having arms extending laterally beyond the lateral edges of the lower portion for supporting the hanger in a rack, said lower portion having one surface on which are a plurality of lands, film supporting pins projecting outwardly from certain of said lands, and means on said one surface restricting lateral movement of film supported on said pins.

4. A film hanger for holding film during processing operations comprising a translucent panel having a lower portion on one surface of which film is adapted to be supported, and an upper portion having arms extending laterally beyond the lateral edges of the lower portion for supporting the hanger in a rack, said lower portion having one surface on which are a plurality of lands, film supporting pins projecting outwardly from certain of said lands, and vertically extending channel members mounted on said one surface adjacent to the lateral edges thereof and midway between the lateral edges for receiving lateral edges of film supported on said pins.

5. A film hanger for holding film during processing operations comprising a translucent panel having a panel portion on which film is adapted to be supported, a plurality of lands on one surface of said panel portion arranged to define four quadrants, channel members arranged vertically on opposite sides of each of said quadrants, and pins projecting from certain of said lands for supporting film, said panel having laterally extending arms for supporting the film hanger in a rack.

6. A film hanger as defined in claim 5 wherein each of said quadrants has a land located centrally thereof.

References Cited by the Examiner
UNITED STATES PATENTS

| | | | |
|---|---|---|---|
| 2,290,831 | 7/1942 | Fink | 95—100 |
| 2,436,882 | 3/1948 | Edelhart | 95—100 |
| 3,054,341 | 9/1962 | Wolber | 95—100 |

NORTON ANSHER, *Primary Examiner.*

CLIFFORD B. PRICE, *Examiner.*